United States Patent

[11] 3,550,969

| [72] | Inventor | Mayes R. Robinson<br>P.O. Box 365, Gilroy, Calif. 95020 |
|---|---|---|
| [21] | Appl. No. | 675,650 |
| [22] | Filed | Oct. 16, 1967 |
| [45] | Patented | Dec. 29, 1970 |

[54] TOOL CLAMP FOR AGRICULTURAL MACHINERY
9 Claims, 6 Drawing Figs.

[52] U.S. Cl.............................................. 306/1.5, 287/51
[51] Int. Cl............................................... A01b 15/12
[50] Field of Search............................................. 306/1.5; 287/54A, 54B, 49, 51

[56] References Cited
UNITED STATES PATENTS
| 590,844 | 9/1897 | Lester ......................... | 306/1.5 |
| 999,516 | 8/1911 | Noaker......................... | 306/1.5 |
| 1,463,353 | 7/1923 | White............................ | 306/1.5 |
| 2,873,149 | 2/1959 | Redetzke..................... | 306/1.5 |
| 3,157,415 | 11/1964 | Martin.......................... | 287/54A |

FOREIGN PATENTS
| 654,558 | 6/1951 | Great Britain................ | 287/54B |
| 406,603 | 8/1966 | Switzerland.................. | 287/51 |

*Primary Examiner*—David J. Williamowsky
*Assistant Examiner*—Andrew V. Kundrat
*Attorney*—Paul Bliven ABSTRACT: A single piece tool bar clamp body having seat means to receive a tool shank and tool bar with their axes in crossed relationship and with a nut slot provided in said body for holding a nut in which is threaded a screw for engaging the tool shank to hold it against the seat. A cap is placed in opposition to the tool bar seat and bolted to the body in opposition to the tool bar seat so as to hold the tool bar against its seat.

INVENTOR.
MAYES R. ROBINSON
BY Paul Bliven

TOOL CLAMP FOR AGRICULTURAL MACHINERY

FIELD OF THE INVENTION

The present invention relates to a tool clamp for use in securing the round or rectangular sectioned shank of a ground engaging tool to a square sectioned tool bar carried by a ground working agricultural machine. In more particular, the present invention relates to the design of such a clamp so that clamp body and cap may be cast together without a parting line on either cap or body. The invention, also, relates to features of the invention that make such casting possible. Such features are the nonthreading of all bolt and screw holes, the provision of a nut slot parallel to the engaged tool bar's length, and the provision of a body cavity extending the full length of the clamp.

DESCRIPTION OF THE PRIOR ART

There have been prior clamps for the purpose of connecting such mentioned tool shanks to such mentioned tool bars but they have not achieved the secure clamping of bar and shank in the clamp as obtained by the present invention. They have not been able to obtain secure clamping with the economy of weight obtained in the present invention. And they have not been able to cast clamp body and cap together without parting lines on cap or body, and to so cast using but a single core.

Having in mind the above state of the art and the defects of the prior devices, it is an object of the present invention to devise a tool bar clamp body and cap that can be cast together by the use of a single core so that neither cap or body will require finishing or machining other than the removal of casting gates.

Another object of the present invention is that of forming the clamp body with a nut slot so positioned that the axis of the slot is in, or substantially in, the neutral plane of the clamp body.

A further object of the present invention is the seating of a tool shank in the clamp at two spaced apart points on the clamp body on one side of the shank and a load point on the other side between the two so that the portion of the shank in the clamp is held there in the manner of a beam with center loading.

SUMMARY OF THE INVENTION

The present invention results from two basic considerations in the design of a clamp for the securing of tool shanks to a tool bar. The first consideration is that loads applied to the clamp by the tool shank and transmitted to the tool bar in the form of torsion, cause the clamp to act as a cantilever beam. This means that the material of the clamp should be concentrated in the top and bottom edge portions and that such edge portions should be continuous from end to end of the body of the clamp. This results in the formation of a desired nut slot in the neutral plane of the body considered as a cantilever and not transversely thereof where it would reduce or misshape the top and bottom edge portions. The second consideration is that of forming the body by casting without a parting line that would require labor in the removal of flashing material from the parting line. This has been accomplished by internally opening the clamp body from end to end, by casting body and cap together with the use of a single core with the parting line on the core, and by tapering the clamp body from one end to the other. Putting the nut slot in the neutral plane allows the body of the clamp to be tapered from the bar seat end outwardly to obtain proper pattern draft and to obtain a structurally economical shape, substantially uniform stressing of the body material throughout.

BRIEF DESCRIPTION OF THE DRAWING

Two modifications of the invention briefly described above are hereinafter described in detail and illustrated in the accompanying drawings, in which.

DESCRIPTION OF THE PREFERRED EMBODIMENTS

Figure 1:
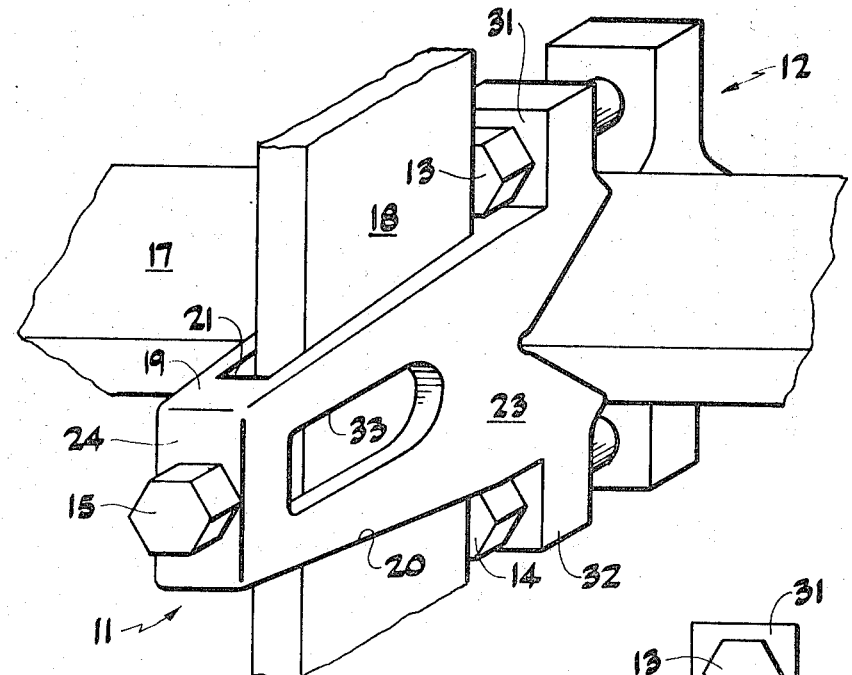
FIG. 1 is an isometric view of one form of the clamp of the invention adapted to secure and illustrated securing a rectangular sectioned tool shank to a square tool bar, only short sections of the bar and clamp being illustrated.
Figure 4:
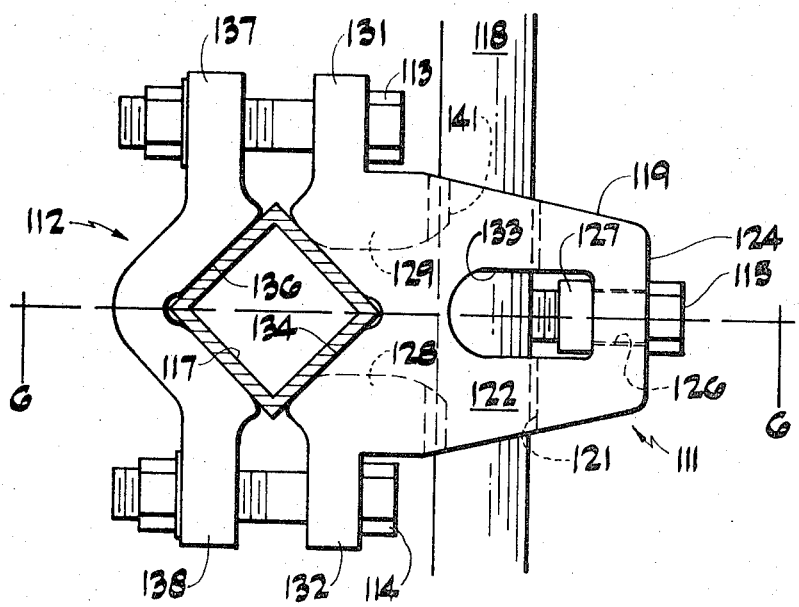
FIG. 4 is a side elevational view similar to the showing of FIG. 2 but of a form of the clamp adapted to secure and illustrated securing a round sectioned tool shank to a square tool bar, only short sections of the bar and clamp being illustrated.

Neither of the modifications illustrated in the drawings is preferred over the other. Some tool bars are rectangular and some are round, as found in presently used agricultural machinery. The modification of FIG. 1 is for use with rectangular sectioned shanks and the modification of FIG. 4 is for use with round sectioned shanks. However, the later modification has an inventive feature not found in the first modification. The features mentioned in the above summary of the invention are found in both modifications.

Figure 3:
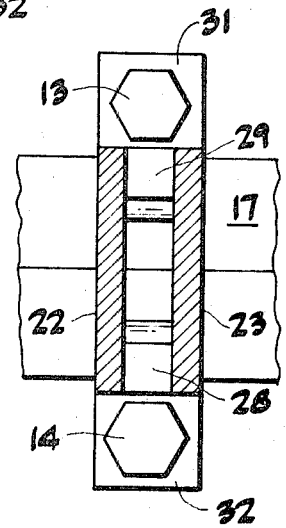
FIG. 3 is a section on the line 3-3 of FIG. 2.
Figure 2:
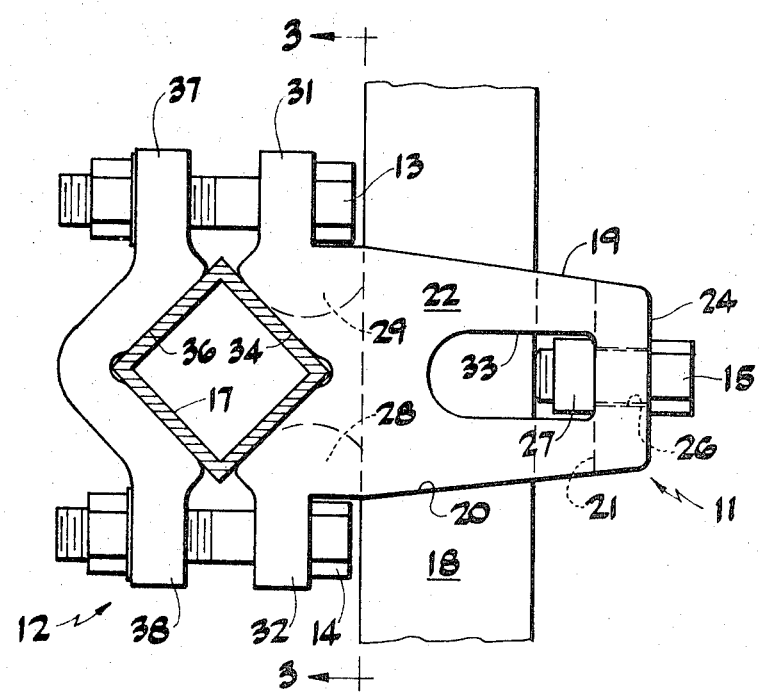
FIG. 2 is a side elevational view of the clamp of FIG. 1.
Figure 5:
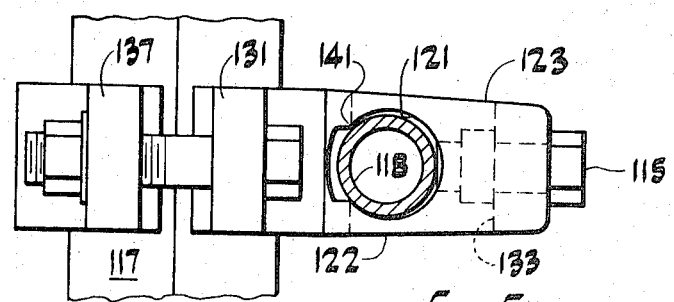
FIG. 5 is a top view of FIG. 4.
Figure 6:
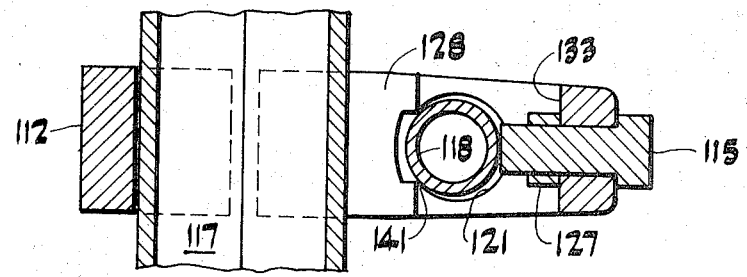
FIG. 6 is a section on the line 6-6 of FIG. 4.

In the modification illustrated in FIGS. 1, 2, and 3, the parts of the clamp are the body 11, the cap 12, the cap retaining bolts and nuts 13, 14, and the shank setscrew 15. In the isometric view of FIG. 1 the clamp is illustrated showing it holding in crossed relationship short sections of a square sectioned hollow tool bar 17 and of a rectangular sectioned tool shank 18. Generally and for most needs, the tool bar 17 extends across the machine to which it is secured and across the intended direction of travel of the machine during ground working operations. The tool shank 18 is usually mounted to cross the bar at right angles therewith and behind the bar, that is, the shank moves parallel to the ground ahead of the shank. The bar is above the ground and the tool bar extends downward to a tool secured thereto that may be in, partly in, or above the ground. Thus the main forces on the shank tend to bend it backward below the clamp. Also, there are, at times, upward axial loads and side loads on the shank. The main, or principle, load on the shank 18 forces the back, or outer, end of the clamp upward to cause it to act as a cantilever beam with negative loading, and to torsionally load the tool bar 17. This means that the material at the top edge 19 of the clamp body 11 is in compression and the material at the bottom edge 20 is in tension. While such loading will place the neutral plane of the body above the center line between top and bottom edges, for the practical reason that the clamp is symmetrical about a center line from front to back ends and, thus, either edge may be the top edge from time to time, the neutral plane will be considered to include such center line. The center line will be considered to be substantially in the neutral plane, and the stresses in the top and bottom edge portions to be equal and to be maximum stresses. Thus the maximum width opening through the top 19 and bottom 20 edges should be no more than necessary to accommodate the shank 18 as illustrated by the shank opening 21. The top and bottom side edge portions are regular in thickness and free of bends or curves. The shank opening top and bottom is a regular rectangle, and no other opening in the top or bottom edge is of greater width across the body than the width of the shank slot opening 21. Also, in an effort to approximate attaining uniform stressing of the material of the clamp body, all of the outer surfaces of the body have been tapered from the bar seat end to the outboard end. This tapering of the body has made it possible to cast the body and its cap together in a particular manner described later. In fact, the clamp body may be considered to be formed of two side plates 22, 23 and means spacing them apart. The rear spacing means is a block 24 that is integral with the side plates and has formed therein an opening 26 for the slidable reception therethrough of the setscrew 15. The inside face of the block forms the back edge of opening 21. The screw 15 is threaded in a nut 27 that bears against the inside of the block 24. The axis of the screw is on the axis of the body. The plates are spaced apart at their forward end by a small block 28, 29 in each of the forward corners so as to leave a space therebetween. These corner blocks and the plates are integral and are extended outward to form bolt ears 31, 32. Each ear has a bolt hole formed therein for the reception of one of the bolts 13, 14. Each bolt hole is space from its adjacent block a distance that will position a flat of the bolt head against the block so that the bolt will not turn when in the hole with the head seated on the ear. Each of the side plates is formed with a setscrew nut opening, and the back spacing block 24 is slotted so that the openings and slot form a setscrew nut slot 33 through the body from side to side. The width of the slot, between the edges of the body, gives the nut 27 a loose fit but prevents turning. The depth of the slot is enough to take the nut out of the shank opening 21. In the side plates, the setscrew nut opening extends forward past the middle of the shank slot and is then formed with a rounded end. This axial lengthening of the nut slot in the side plates acts to lighten the plates along their neutral plane and makes it easier to locate the nut coaxially of the screw opening 26.

When a rectangular tool shank 18 is placed in the opening 21, and the setscrew 15 is in its nut 27, tightening of the screw against the shank forces it against the forward corner spacing blocks 28, 29. The areas of the seat of contact of the blocks with the shank are small and spaced apart with the clamping force from the cap screw being applied midway between the extended areas. This causes the shank to act as a beam with center loading and the shank deflects under such loading. The opening between the corner blocks allows for this deflection. This bending of the shank is not beyond its yield point, and, so, the resiliency of the shank locks it in the shank opening 21 of the clamp. Aligned V-shaped notches in the forward ends of the side plates 22, 23 form a tool bar seat 34 that extends across the clamp body and seats the tool bar 17 at right angles to the tool shank 18. The apex of the bar seat is on the axis of the body, and the legs of V-shape form equal angles with the body axis.

The cap 12 is formed with a V-shaped seat 36 that is of the same form as the body's bar seat 34. The cap is provided with ears 37, 38 that will align with the body ears 31, 32, and bolt holes in the ears in alignment with the bolt holes in the body's ears. The securing of the clamp to a square sectioned tool bar is accomplished by fitting the body's bar seat 34 to two adjacent side faces of the bar 17 and the cap's seat 36 to the two other adjoining side faces of the bar, and inserting the cap retaining bolts 13, 14 in the cap and body ear holes, and tightening nuts on these bolts. The sides of the V-shaped notches 34, 36 are straight, flat, so that they will conform to the sides of the bar so that when the bolts are tight the clamp will not rock on the bar. In the past, the caps for such clamps have been made by forging the cap from bar stock. However, in such prior construction process, the resulting seats have not been flat. Each leg surface of the V-shaped notch has been convex from the ear to the apex of the V-shape. This has prevented the prior caps from firmly gripping the bar and has allowed the clamps to rock thereon. This defect of the prior art has been remedied by casting the caps as well as the clamp bodies, and caps and bodies have been cast together.

As previously mentioned, the tapering of the clamp body from the bar seat end to the outboard end has the advantage of approximating uniform stressing of the body material, and the advantage of casting the body and cap together without a parting line flashing on either cap or body, and the advantage of using but a single core for all openings and holes in both cap and body. The cap and body have been cast together in the relative position of the cap and body shown in FIG. 2 with possibly a bit more spacing between cap and body. The single core provides the setscrew opening 26, the nut slot 33, the shank opening 21, the opening between the forward corner spacing blocks 28, 29, the cap and body tool bar seats 34, 36, the spacing between cap and body and the bolt openings in the cap and body ears. The casting gates come at the ends of the ears. The parting line comes on the core between the cap and the body, and the draw of the body is along its axis. Thus, the only casting finishing is the cutting off of the gates from the ends of the ears. There is no grinding, machining, or threading of the castings.

The modification illustrated in FIG. 4 is a design to accommodate tools having round shanks. The basic features of this clamp modification are the same as those of the clamp for rectangular shanks. The same and similar parts of the two modifications differ in reference numbers by one hundred. The body 111 and the cap 112 are thicker than the ones for the square shank because the diameter of the round shank 118 is greater than the thickness of the rectangular shank for the same tool loading. However, the axial length of the body, from the tool bar end to the outboard end, is less. The body tapers from the tool bar end to its outboard end on all outer surfaces. The tool shank opening 121 is generally circular. The interior of the body is open from end to end along its axis. This interior opening includes the setscrew opening 126, portions of the setscrew nut slot 133 and of the shank opening 121, and the space between the forward spacing blocks 128, 129 through the bottom of the bar seat V-shaped notch 134.

The forward end of the shank opening 121 that is the backs of the spacing blocks 128, 129 form the extended seat of the tool shank. Each of these backs of the spacing blocks is provided with a pair of ribs 141, or corners, that have their edges parallel to the axis of a tool shank when in the tool shank opening 121 and presented against the forward surface of the shank. Tightening of the setscrew 115 in its nut 127 and against such tool shank forces it against the edges of the ribs 141 to imbed them in the shank and prevent its turning about its length. The spacing of the ribs on one block 128 from those on the other block 129 and the application of the setscrew 115 to the shank midway between the pairs of ribs causes the shank to act as a beam with center loading, to be deflected between such pairs of ribs and to, thus, be locked in place in the clamp body. The body 111 and cap 112 are secured together and to a square tool bar in the manner previously described for the body 11 and cap 12.

I claim:

1. A single piece tool bar clamp body, having, integral therewith, means forming extensive seats for a tool shank and a tool bar adapted to carry a plurality of such clamps and tool shanks, said seats being arranged to seat thereon such a shank and bar with their axes in crossed relationship, and each seat having its extension parallel to one of said axes, and said clamp body having means forming a nut slot for the reception therein of a nut, and said slot having its axis transverse the extension of said shank seat, whereby a screw may enter into threaded engagement with a nut in said nut slot to lock a such tool shank in said clamp and on said tool shank seat, and said body having therewith a cap placed in opposition to said tool bar seat, said cap and body formed with bolt holes at each side thereof for the reception at each side of said cap and body of a bolt to secure said cap to said body in opposition to said bar seat.

2. The combination of claim 1 in which the axes of said bolt holes are parallel to each other and transverse the extension of said tool shank seat.

3. The combination of claim 1 in which said seat forming means and means forming a nut slot includes spaced apart parallel plates forming the sides of the body of such clamp, a notch formed in an edge portion of each of said plates to form said tool bar seat with its extension transverse said plates, said tool shank seat being between said plates, and said nut slot extending through and transverse said plates.

4. The combination of claim 1 in which said body as defined by its exterior surfaces tapers the length thereof from the end adjacent said tool bar seat to the other end thereof.

5. The combination of claim 1 in which said shank seat is composed of spaced apart portions, each portion located adjacent an exterior surface of said clamp and confined to opposite ends of said shank seat.

6. A single piece tool bar clamp body, having integral therewith, means forming extensive seats for a tool shank and a tool bar adapted to carry a plurality of such clamps and tool shanks, said seats being arranged to seat thereon such a shank and bar with their axes in crossed relationship, and each seat having its extension parallel to one of said axes, and said clamp body having means forming a nut slot for the reception therein of a nut, and said slot having its axis transverse the extension of said shank seat, whereby a screw may enter into threaded engagement with a nut in said nut slot to lock a such tool shank in said clamp and on said tool shank seat, in which body said tool bar seat is formed in the exterior of one end of said body and said nut slot is adjacent the opposite end thereof, and in which said body is formed with an interior opening extending from end to end thereof and through said bar seat, and in which said body as defined by its exterior side and edge surfaces tapers the length thereof from the end adjacent said bar seat to said opposite end thereof.

7. The combination of claim 6 in which said seat forming means and means forming a nut slot includes spaced apart parallel plates forming the sides of the body of such clamp, a notch formed in an edge portion of each of said plates to form said tool bar seat with its extension transverse said plates, said tool shank seat being between said plates, and said nut slot extending through and transverse said plates.

8. The combination of claim 6 in which said shank seat is composed of spaced apart portions, each portion located adjacent an exterior surface of said clamp and confined to opposite ends of said shank seat.

9. A single piece tool bar clamp body, having, integral therewith, means forming extensive seats for a tool shank and a tool bar adapted to carry a plurality of such clamps and tool shanks, said seats being arranged to seat thereon such a shank and bar with their axes in crossed relationship, and each seat having its extension parallel to one of said axes, and said clamp body having means forming a nut slot for the reception therein of a nut, and said slot having its axis transverse the extension of said shank seat, whereby a screw may enter into threaded engagement with a nut in said nut slot to lock a such tool shank in said clamp and on said tool shank seat, and in which body said shank seat is composed of spaced apart portions, each portion located adjacent an exterior surface of said clamp and confined to opposite ends of said shank seat, and in which said means forming seats includes said clamp body having formed therein a shank seat opening in which are located said spaced portions, and each of said portions provided with two ribs that are parallel to the extension of said shank seat, are to a side of said shank seat opening, and against which a such shank is seated by a such screw.